US012128674B2

(12) United States Patent
Nishikawa et al.

(10) Patent No.: US 12,128,674 B2
(45) Date of Patent: Oct. 29, 2024

(54) IMAGE RECORDING APPARATUS DOWNSIZED IN VERTICAL DIRECTION

(71) Applicant: BROTHER KOGYO KABUSHIKI KAISHA, Nagoya (JP)

(72) Inventors: Yasuo Nishikawa, Nagoya (JP); Hiroaki Takahashi, Nagoya (JP); Takuya Tsuji, Chiryu (JP); Yoshimitsu Taniguchi, Tajimi (JP); Kosuke Inuzuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 48 days.

(21) Appl. No.: 17/814,569

(22) Filed: Jul. 25, 2022

(65) Prior Publication Data

US 2023/0094327 A1 Mar. 30, 2023

(30) Foreign Application Priority Data

Sep. 30, 2021 (JP) ................................ 2021-160366

(51) Int. Cl.
*B41J 11/70* (2006.01)

(52) U.S. Cl.
CPC .................................... *B41J 11/70* (2013.01)

(58) Field of Classification Search
CPC ........ B41J 11/70; B41J 13/106; B41J 11/706; B26D 1/045; B26D 7/2614; B26D 2007/005; B26D 2007/0087
USPC .......................................................... 347/104
See application file for complete search history.

(56) References Cited

U.S. PATENT DOCUMENTS

2002/0001072 A1* 1/2002 Suzuki .................. B41J 13/106 355/29
2012/0140010 A1* 6/2012 Ogawa .................. B26D 1/045 347/104
2021/0122174 A1* 4/2021 Tanaka .................. B41J 2/1752

FOREIGN PATENT DOCUMENTS

JP 2020-11393 A 1/2020

* cited by examiner

*Primary Examiner* — Jason S Uhlenhake
*Assistant Examiner* — Alexander D Shenderov
(74) *Attorney, Agent, or Firm* — Merchant & Gould P.C.

(57) ABSTRACT

An image recording apparatus includes a housing, an operation panel, a sheet conveyor, a recording device, and a cutting device. The operation panel is disposed at a first-side face of the housing in a first direction. The first direction is orthogonal to a vertical direction and extends from a first side to a second side of the image recording apparatus. In the first direction, the cutting device is closer to the first side of the image recording apparatus than the recording device is and closer to the second side of the image recording apparatus than the operation panel is. The cutting device includes a cutter, and a cutter carriage to move with the cutter mounted thereon along a second direction orthogonal to the first direction and the vertical direction. The operation panel overlaps a movable area of the cutter carriage when viewed in the first direction.

8 Claims, 7 Drawing Sheets

IMAGE RECORDING APPARATUS DOWNSIZED IN VERTICAL DIRECTION

REFERENCE TO RELATED APPLICATIONS

This application claims priority from Japanese Patent Application No. 2021-160366 filed on Sep. 30, 2021. The entire content of the priority application is incorporated herein by reference.

BACKGROUND ART

As an image recording apparatus having a cutting function to cut a sheet, a printing apparatus has been known that includes an operation panel disposed at a front face of a housing, a recording device configured to perform image recording on a roll sheet being conveyed along a conveyance path, and a cutter unit configured to cut the roll sheet with an image recorded thereon by the recording device. The cutter unit is disposed below the operation panel.

DESCRIPTION

In the known printing apparatus, since the cutter unit is disposed below the operation panel, there is a problem that the printing apparatus is enlarged in the vertical direction.

Aspects of the present disclosure are advantageous to provide one or more improved techniques to achieve an image recording apparatus downsized in the vertical direction that has a cutting device to cut a sheet.

According to aspects of the present disclosure, an image recording apparatus is provided, which includes a housing, an operation panel, a sheet conveyor, a recording device, and a cutting device. The operation panel is disposed at a first-side face of the housing. The first-side face is a surface on a first side of the housing in a first direction. The first direction is orthogonal to a vertical direction and extends from the first side to a second side of the image recording apparatus. The sheet conveyor is configured to convey a sheet along a conveyance path and discharge the sheet toward the first side. The recording device is configured to perform image recording on the sheet being conveyed along the conveyance path. The cutting device is disposed closer to the first side of the image recording apparatus than the recording device is in the first direction, and closer to the second side of the image recording apparatus than the operation panel is in the first direction. The cutting device includes a cutter and a cutter carriage. The cutter is configured to cut the sheet. The cutter carriage is configured to move with the cutter mounted thereon along a second direction orthogonal to the first direction and the vertical direction. The operation panel overlaps a movable area of the cutter carriage when viewed in the first direction.

FIG. 1 is an external perspective view of an image recording apparatus.

FIG. 2 schematically shows a configuration of the image recording apparatus.

Figure 6:
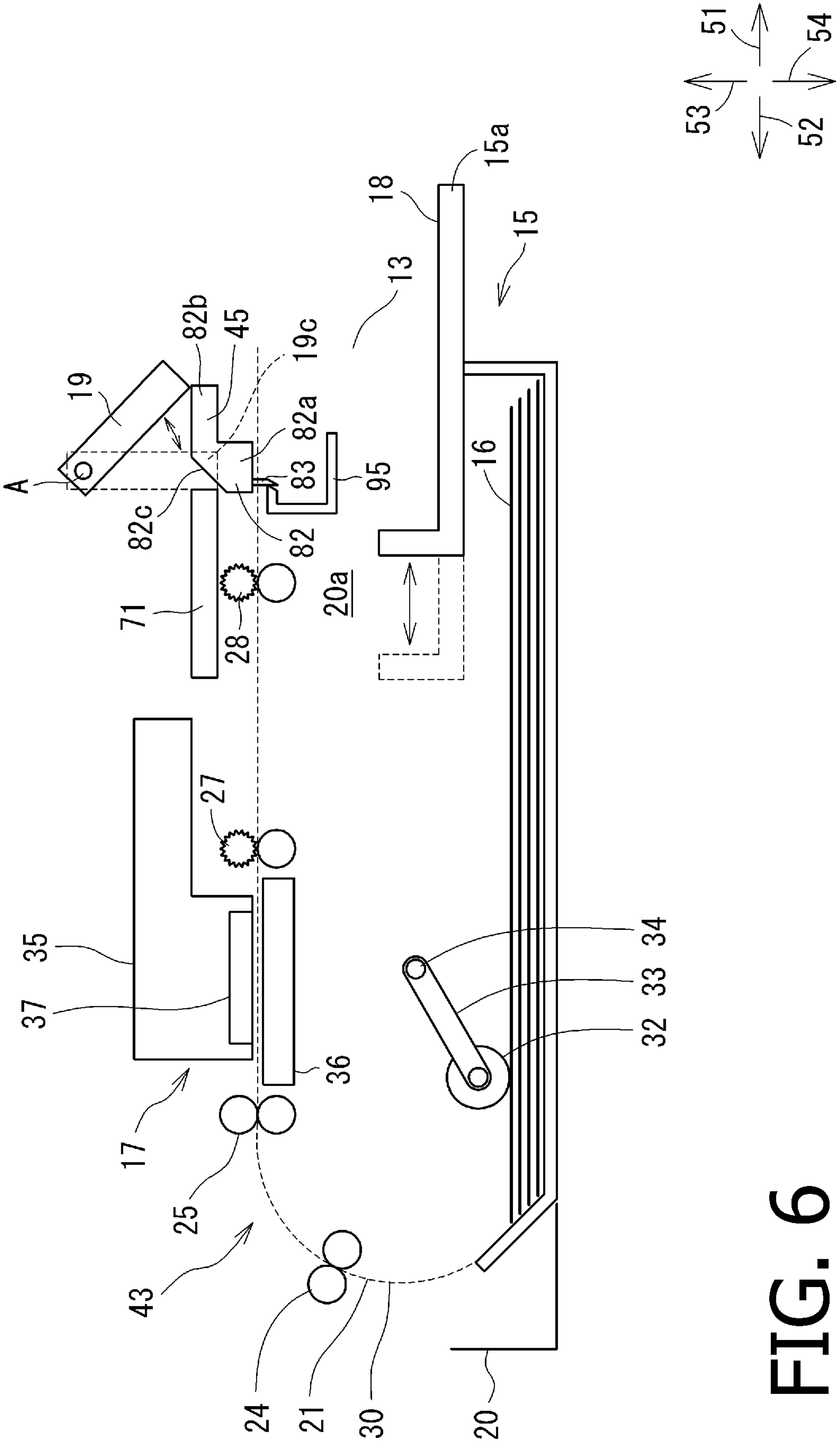

FIG. 6 schematically shows another configuration of the image recording apparatus.

Figure 7B:
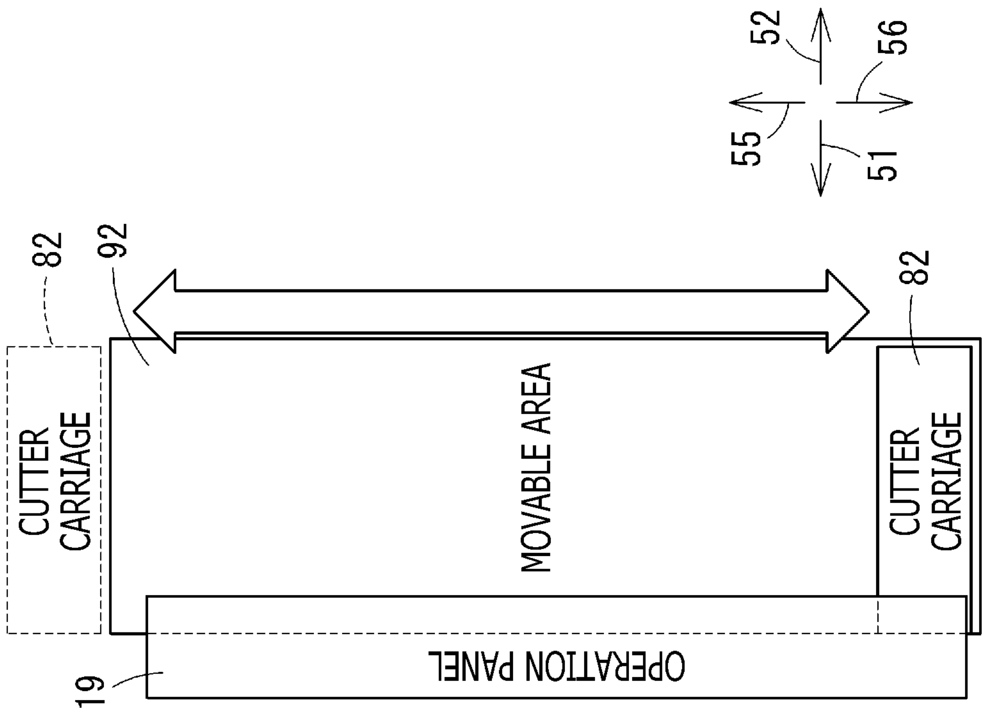
Figure 7A:
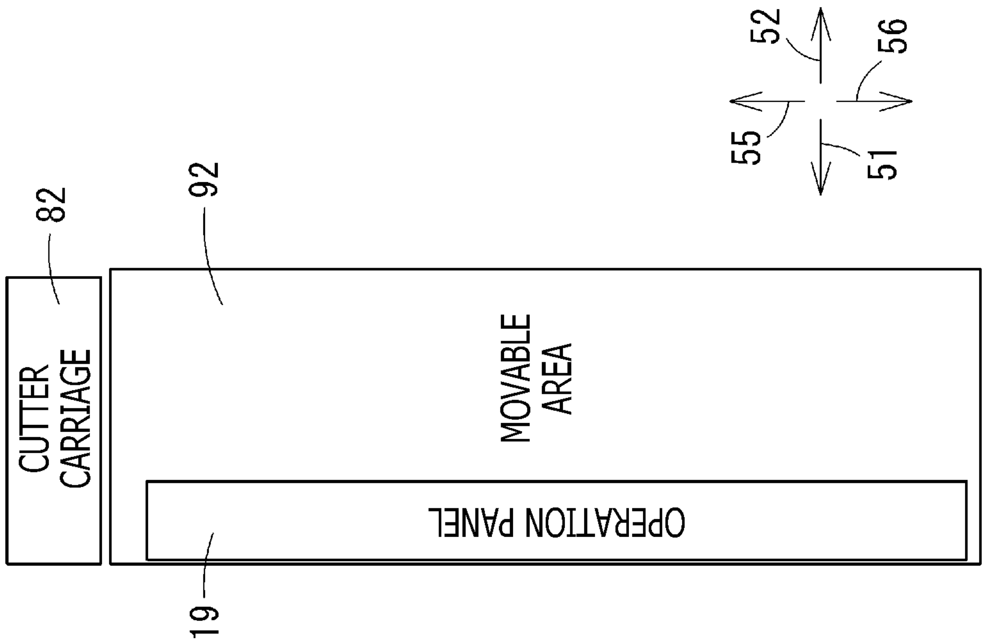

FIG. 7A schematically shows a state where an operation panel of the image recording apparatus shown in FIG. 6 is in a first position.

FIG. 7B schematically shows a state where the operation panel of the image recording apparatus shown in FIG. 6 is in a second position.

It is noted that various connections are set forth between elements in the following description. It is noted that these connections in general and, unless specified otherwise, may be direct or indirect and that this specification is not intended to be limiting in this respect.

Hereinafter, an illustrative embodiment according to aspects of the present disclosure will be described with reference to the accompanying drawings. It is to be understood, needless to say, that the illustrative embodiment described below is merely one example in which aspects of the present disclosure are embodied and that aspects of the present disclosure are capable of use in various other combinations and environments and are capable of changes or modifications within the scope of the inventive concept as expressed herein. In the following description, a direction in which an opening 13 is open in a print engine 11 will be defined as a frontward direction 51. An opposite direction of the frontward direction 51 will be defined as a rearward direction 52. The frontward direction 51 and the rearward direction 52 together may be referred to as front-rear directions 51 and 52. Upward and downward directions orthogonal to the front-rear directions 51 and 52 may be referred to as vertical directions 53 and 54. Directions orthogonal to the front-rear directions 51 and 52 and the vertical directions 53 and 54 may be referred to as left-right directions 55 and 56. An upward one of the vertical directions 53 and 54 will be defined as an upward direction 53. A downward one of the vertical directions 53 and 54 will be defined as a downward direction 54. When an image recording apparatus 10 is viewed in the rearward direction 52 (i.e., when the image recording apparatus 10 is viewed from the front), a leftward one of the left-right directions 55 and 56 will be defined as a leftward direction 55. In this case, a rightward one of the left-right directions 55 and 56 will be defined as a rightward direction 56.

Figure 1:
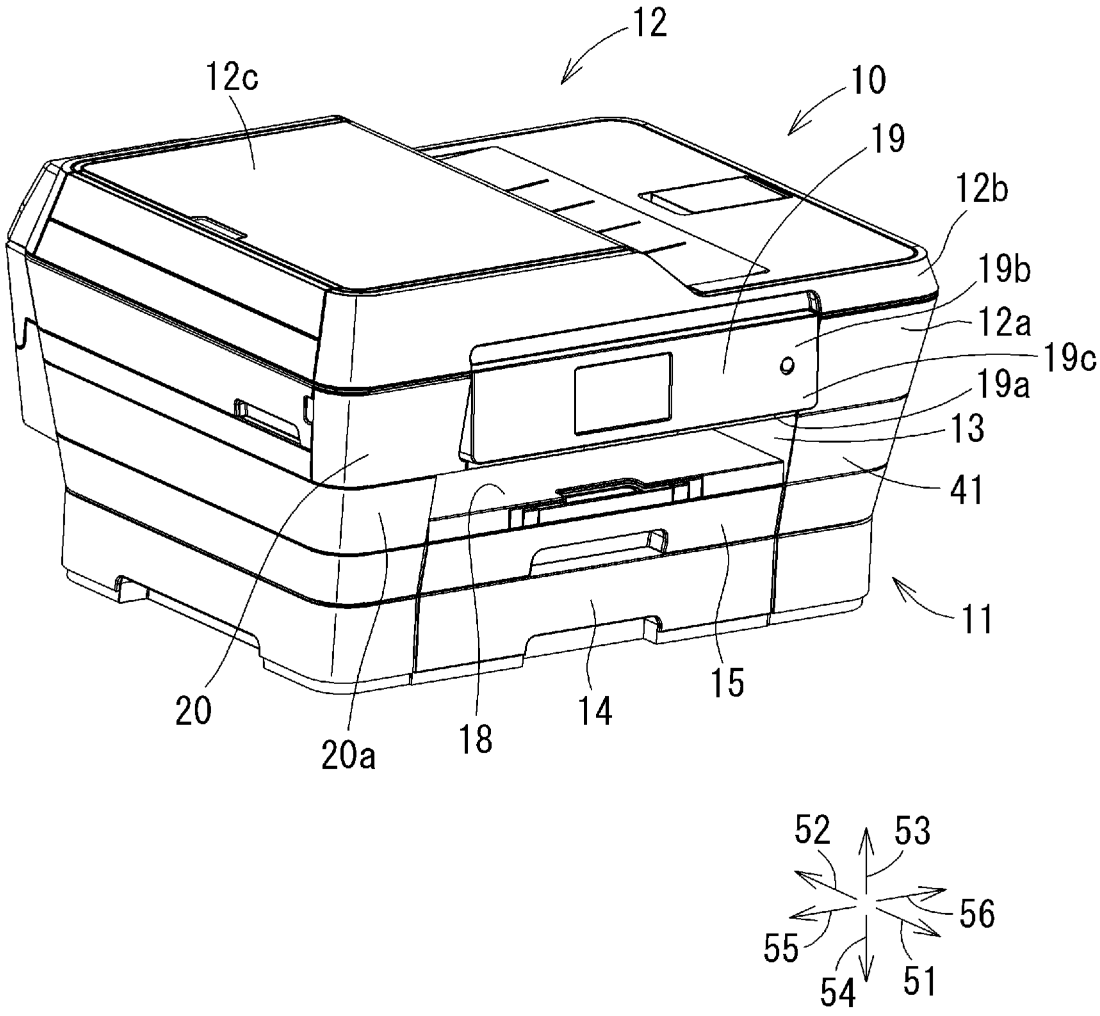

As shown in FIG. 1, the image recording apparatus 10 is a multi-function peripheral integrally provided with the print engine 11 and a scan engine 12. The print engine 11 is disposed at a lower portion of the image recording apparatus 10. The scan engine 12 is disposed at an upper portion of the image recording apparatus 10. The image recording apparatus 10 has a printing function, a scanning function, a copy function, and a facsimile function. The image recording apparatus 10 does not necessarily have the scan engine 12, and may be a single-function printer without the scanning function or the copy function.

The image recording apparatus 10 is mainly used in connection with an external information device (not shown) such as a computer. The print engine 11 is configured to record an image on a recording sheet 16 based on print data received from the external information device or on image data of a document scanned by the scan engine 12.

The scan engine 12 is located above the print engine 11. The scan engine 12 is a so-called flatbed scanner. The scan engine 12 includes a scanner body **12*a* disposed above the print engine 11, and a document cover 12*b* disposed above the scanner body 12*a*. On an upper surface of the scanner body 12*a*, a platen glass (not shown) is disposed on which a document sheet is placed. Inside the scanner body 12*a*, an image sensor (not shown) is disposed that is configured to optically read an image of the document placed on the platen glass. The document cover 12***b* includes an ADF ("ADF" is an abbreviation for "Automatic Document Feeder") 12*c* that is configured to pick up and feed, on a sheet-by-sheet basis, a plurality of document sheets to be scanned.

[Print Engine]

A configuration of the print engine 11 will be described below with reference to FIGS. 1 to 3. It is noted that in FIG. 2, a sheet feed cassette 14 is not shown for the sake of simplified explanation.

Figure 2:
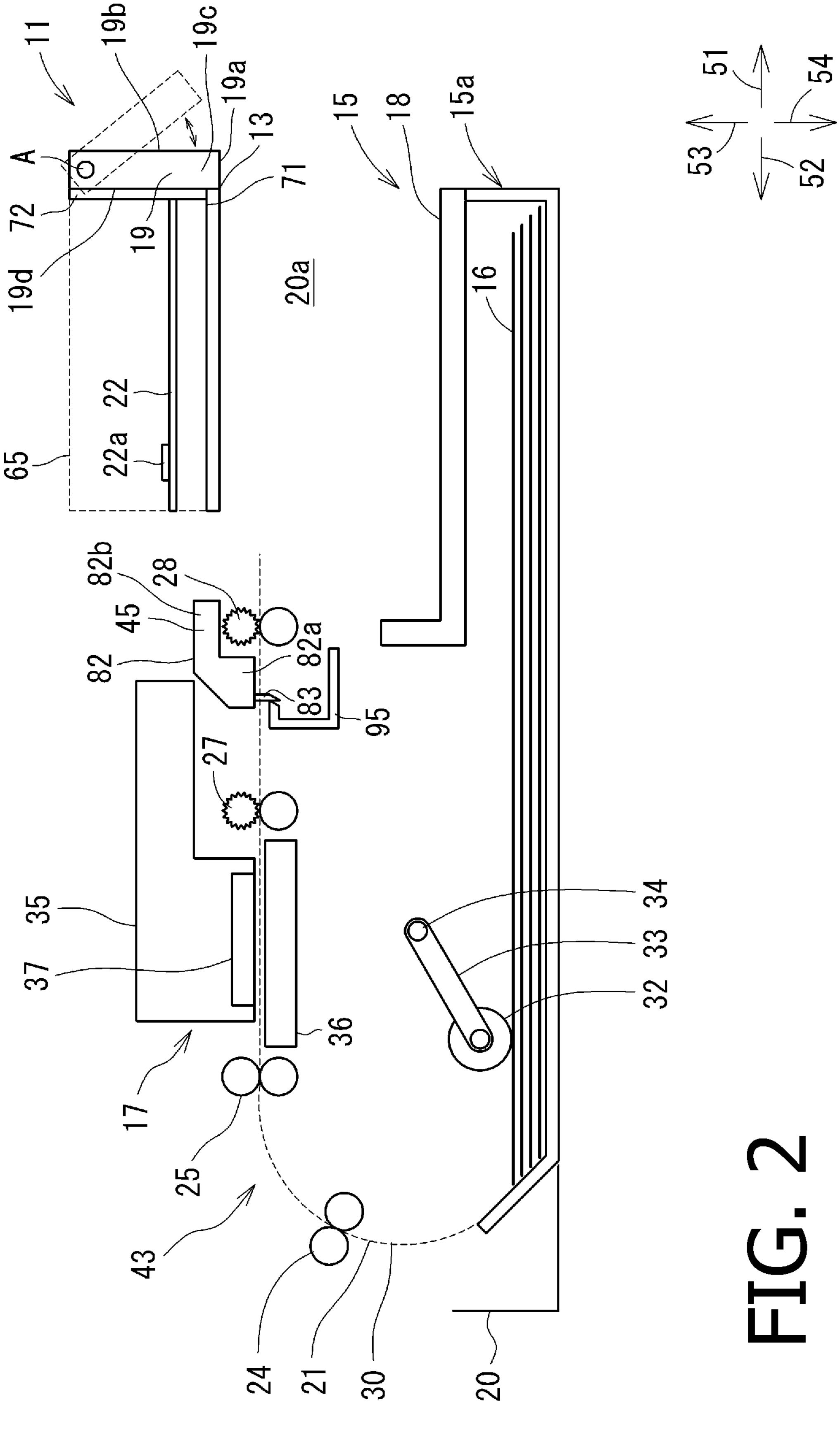

As shown in FIGS. 1 and 2, the print engine 11 has a housing 20. The housing 20 contains therein the sheet feed cassette 14, a sheet feed cassette 15, a recording device 17, a cutting device 45, and other functional elements. An operation panel 19 is disposed on a front face 20*a* of the housing 20.

The operation panel 19 is formed in the shape of a flat plate having a thickness in the front-rear directions 51 and 52. Each of a front surface 19*b* and a rear surface 19*d*, of the operation panel 19, have a rectangular shape with a longitudinal direction along the left-right directions 55 and 56. The operation panel 19 is located at a central portion of the front face 20*a* of the housing 20 in the left-right directions 55 and 56. An upper end of the operation panel 19 is located near an upper end of the front face 20*a* of the housing 20. A lower end 19*a* of the operation panel 19 is located above a middle position of the front face 20*a* of the housing 20 in the vertical directions 53 and 54.

The operation panel 19 is configured to rotate around an axis A extending along the left-right directions 55 and 56. The axis A is located at an upper portion of the operation panel 19. The operation panel 19 is configured to rotate from a position where the front surface 19*b* faces forward to a position where the operation panel 19 is located ahead of the above position. In other words, the operation panel 19 is rotatable from a position where the front surface 19*b* faces in the frontward direction 51 to a position where the front surface 19*b* faces in the upward direction 53 and the frontward direction 51. When the front surface 19*b* of the operation panel 19 faces forward, the operation panel 19 is in an erected state where the operation panel 19 extends downward from the axis A to a lower portion 19*c*. In other words, when the operation panel 19 is in the erected state, the front surface 19*b* facing forward forms a plane perpendicular to a horizontal plane. It is noted that the lower portion 19*c* is a portion lower than a middle position of the operation panel 19 in the vertical directions 53 and 54.

On the front surface 19*b* of the operation panel 19, a display and input keys are provided. The display is configured to display thereon various types of information. The input keys are configured to receive input of information. The image recording apparatus 10 is configured to operate based on instruction information input via the operation panel 19 or instruction information sent by the external information device through a printer driver or a scanner driver.

An opening 13 is located below the operation panel 19 on the front face 20*a* of the housing 20. The opening 13 is located substantially at the central portion of the front face 20*a* of the housing 20 in the left-right directions 55 and 56. The opening 13 is formed in a rectangular shape with a longitudinal direction along the left-right directions 55 and 56. The opening 13 extends from the lower end 19*a* of the operation panel 19 to the lower end of the housing 20.

The housing 20 has an internal space 20*a* extending backward from the opening 13. The internal space 20*a* is communicated with an after-mentioned conveyance path 21. An upper end of the internal space 20*a* is defined by an upper wall 71 extending rearward from an upper end of the opening 13. Two ends of the internal space 20*a* in the left-right directions 55 and 56 are defined by inner side walls (not shown). A lower end of the internal space 20*a* is substantially in the same position as the lower end of the housing 20.

The upper wall 71 separates a board housing space 65 located rearward of the operation panel 19 from the internal space 20*a*. The board housing space 65 is located above the internal space 20*a*. A lower end of the board housing space 65 is defined by the upper wall 71. An upper end of the board housing space 65 is defined by a top wall of the housing 20. A front end of the board housing space 65 is defined by a front wall 72 extending upward from a distal end of the upper wall 71. A front surface of the front wall 72 is adjacent to the rear surface 19*d* of the operation panel 19 in the state where the front surface 19*b* faces forward. Two ends of the board housing space 65 in the left-right directions 55 and 56 are defined by inner side walls (not shown).

The board housing space 65 contains a board 22 with an electronic circuit 22*a* mounted thereon. The electronic circuit 22*a* mounted on the board 22 is electrically connected with the operation panel 19 and the recording head 37. As shown in FIGS. 2 and 3, the board 22 is formed in the shape of a flat plate having a thickness in the vertical directions 53 and 54. The board 22, in a plan view thereof, has a rectangular shape having a longitudinal direction along the left-right directions 55 and 56. For instance, the electronic circuit 22*a* serves as a controller to control operations of the operation panel 19 and the carriage 35.

On the front face 20*a* of the housing 20, an opening/closing cover 41 is attached to the right of the opening 13. When the opening/closing cover 41 is opened, a cartridge attachment space is opened. Thus, ink cartridges 40 to store ink are allowed to be attached to or removed from the housing 20. As shown in FIGS. 2 and 3, the ink cartridges 40 are positioned in front of the recording device 17 in the housing 20. In the illustrative embodiment, four ink cartridges 40 that store four types of ink having respective different colors are attachable to the housing 20. Each ink cartridge 40 is configured to, when attached to the housing 20, supply ink to a recording head 37 of the recording device 17 through a tube 44. The tubes 44 will be described later in detail.

As shown in FIG. 1, the sheet feed cassettes 14 and 15 are attached to the housing 20 in a state where the sheet feed cassettes 14 and 15 are inserted into the opening 13. The sheet feed cassettes 14 and 15 are configured to be inserted into and pulled out of the housing 20 along the front-rear directions 51 and 52. The sheet feed cassette 14 is, when attached to the housing 20, is positioned below the sheet feed cassette 15. As shown in FIG. 2, the sheet feed cassette 15 is configured to hold a stack of standard-form recording sheets 16 set therein. Examples of the standard form of the recording sheets 16 may include, but are not limited to, A3 size, A4 size, and B5 size in the Japanese Industrial Standards. A sheet discharge tray 18 is disposed above the sheet feed cassette 15. The sheet discharge tray 18 is configured to support sheets discharged from the conveyance path 21. In the illustrative embodiment, the two types of sheet feed cassettes 14 and 15 are provided. However, the sheet feed cassette 14 may be omitted.

The sheet feed cassette 15 is configured to hold a plurality of recording sheets 16. The sheet feed cassette 15 is formed in the shape of a container a part of which is open at the rear side (i.e., the left side in FIG. 2) of the image recording apparatus 10. The recording sheets 16 are held in a stacked state in an internal space of the sheet feed cassette 15. The sheet discharge tray 18 disposed above the sheet feed cassette 15 is formed on the front face side (i.e., the right side in FIG. 2) of the image recording apparatus 10. FIG. 2 shows the sheet feed cassette 15 inserted into the housing 20.

As shown in FIG. 2, in the housing 20, a sheet conveyor 43 is disposed that is configured to convey a recording sheet 16 along the conveyance path 21 from the sheet feed cassette 15 to the sheet discharge tray 18. The conveyance path 21 is a so-called U-turn path that extends upward from the sheet feed cassette 15, then curves to make a U-turn toward the front, and further extends straight in the frontward direction 51 toward the sheet discharge tray 18. A downstream end of the conveyance path 21 is communicated with the internal space 20*a*.

The sheet conveyor 43 includes a pick-up roller 32, two intermediate rollers 24, two PF rollers 25, two first discharge rollers 27, and two second discharge rollers 28. Along the conveyance path 21, the above rollers 32, 24, 25, 27, and 28 are disposed in the aforementioned order from the upstream side in a conveyance direction from the sheet feed cassette 15 to the sheet discharge tray 18.

The pick-up roller 32 is disposed above the sheet feed cassette 15. The pick-up roller 32 is provided at a distal end portion of an arm 33. The pick-up roller 32 is rotatable with the left-right direction 55, 56 as a direction of axis. A base end portion of the arm 33 is rotatable around a shaft 34. When the arm 33 rotates, the sheet feed roller 32 moves in such a direction that the pick-up roller 32 is brought into contact with or separated from the sheet feed cassette 15. The arm 33 is rotated toward the sheet feed cassette 15 by the weight of the pick-up roller 32. Thereby, the pick-up roller 32 is brought into contact with a topmost recording sheet 16 of a plurality of recording sheets 16 stacked in the sheet feed cassette 15. When the sheet feed roller 32 rotates in this state, the topmost recording sheet 16 is fed from the sheet feed cassette 15 to the conveyance path 21.

The intermediate rollers 24 are disposed at a curved portion of the conveyance path 21. The intermediate rollers 24 are rotatable with the left-right direction 55, 56 as a direction of axis. The intermediate rollers 24 are configured to rotate by a driving force transmitted from a motor (not shown). The recording sheet 16 fed from the sheet feed cassette 15 to the conveyance path 21 is pinched between the intermediate rollers 24 and conveyed toward the PF rollers 25.

The PF rollers 25 are located near a downstream end of the curved portion of the conveyance path 21 in the conveyance direction. The PF rollers 25 are rotatable with the left-right direction 55, 56 as a direction of axis. The PF rollers 25 are configured to rotate by a driving force transmitted from a motor (not shown). The recording sheet 16 conveyed by the intermediate rollers 24 is pinched between the PF rollers 25 and conveyed toward under the recording head 37.

The first discharge rollers 27 and the second discharge rollers 28 are disposed downstream of the recording head 37 in the conveyance direction, along the conveyance path 21. The first discharge rollers 27 are located upstream of the second discharge rollers 28 in the conveyance direction. The first discharge rollers 27 and the second discharge rollers 28 are configured to rotate by a driving force transmitted from a motor (not shown). The recording sheet 16 conveyed by the PF rollers 25 is pinched between the first discharge rollers 27 and pinched between the second discharge rollers 28, and is conveyed onto the sheet discharge tray 18.

As shown in FIG. 2, the recording device 17 is disposed between the PF rollers 25 and the first discharge rollers 27, along the conveyance path 21. Namely, the recording device 17 is located downstream of the PF rollers 25 and upstream of the first discharge rollers 27 in the conveyance direction. The recording device 17 includes a carriage 35, a platen 36, and the recording head 37. The carriage 35 is located above the conveyance path 21. The platen 36 is located below the conveyance path 21. The recording head 37 is mounted on the carriage 35. A configuration of the carriage 35 will be described later in detail.

Figure 3:
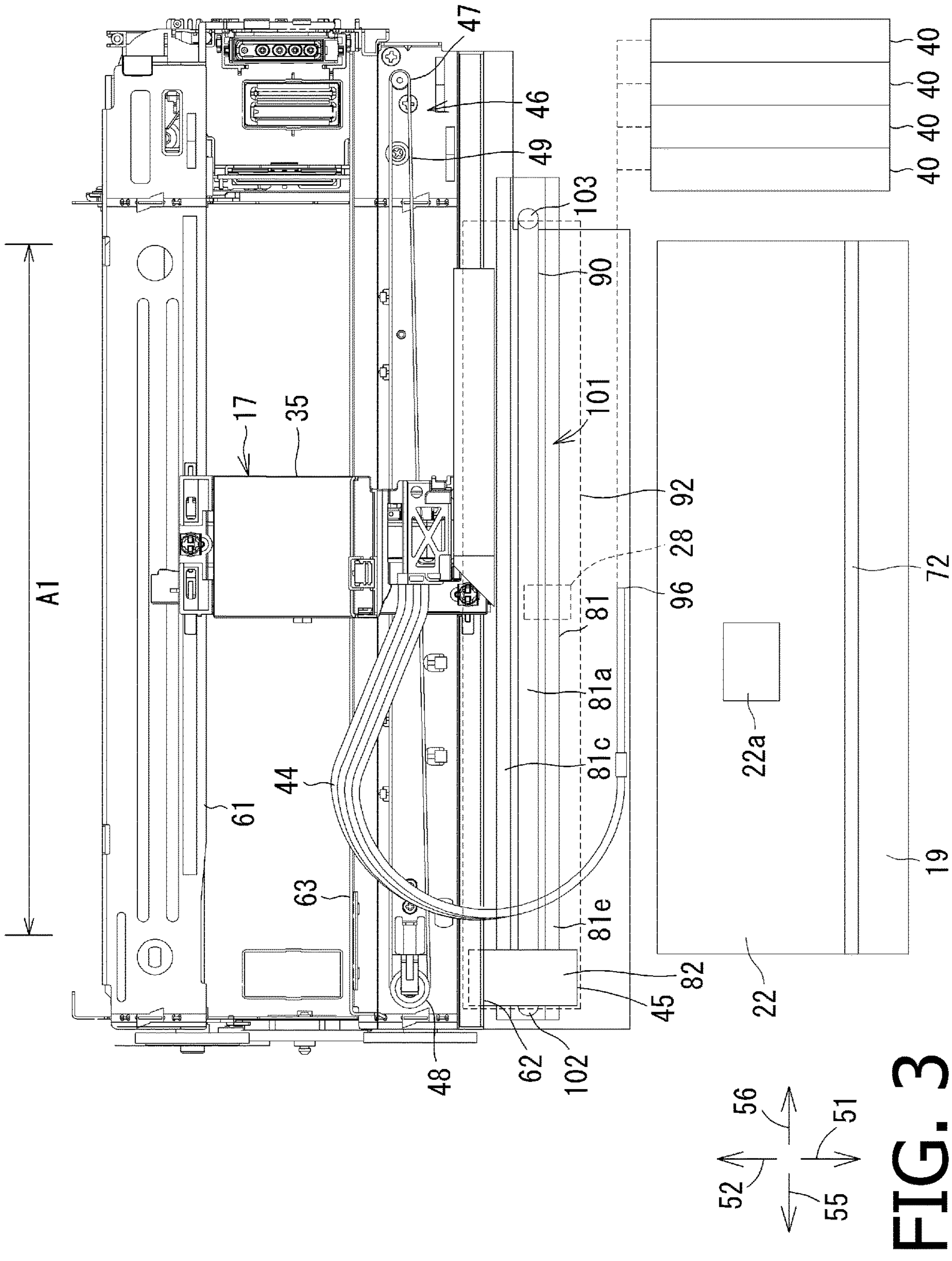
FIG. 3 is a plan view showing an internal configuration of the image recording apparatus.

As shown in FIG. 3, the recording head 37 is a so-called inkjet head configured to be supplied with ink of each color of cyan (C), magenta (M), yellow (Y), and black (Bk) from the ink cartridges 40 through the tubes 44, and to eject the ink of each color as ink droplets. The recording device 17 is configured to perform image recording on the recording sheet 16 being conveyed on the platen 36 by ejecting ink droplets from the recording head 37 while the carriage is reciprocating along the left-right directions 55 and 56.

Figure 4:
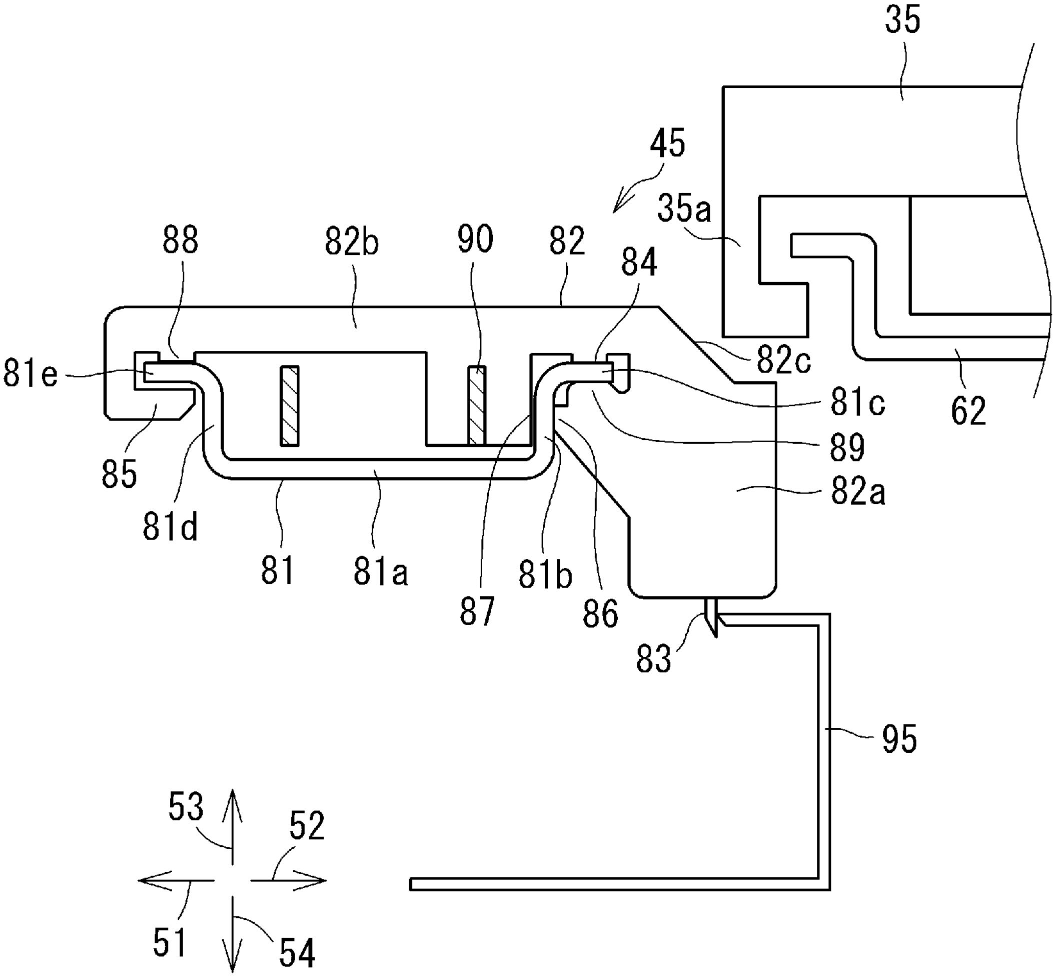
FIG. 4 is a side view of a cutting device of the image recording apparatus.

As shown in FIG. 3, the carriage 35 is supported by guide frames 61 and 62. The guide frames 61 and 62 are spaced apart from each other in the front-rear directions 51 and 52. Each of the guide frames 61 and 62 extends along the left-right directions 55 and 56. The carriage 35 is mounted straddling the guide frames 61 and 62, to be movable in a reciprocating manner along the left-right directions 55 and 56. The guide frame 61 located rearward of the guide frame 62 is formed in the shape of a flat plate longer than a reciprocating range of the carriage 35 in the left-right directions 55 and 56. An upper surface of the guide frame 61 slidably supports a rear end portion of the carriage 35. As shown in FIG. 4, a front end portion 35*a* of the carriage 35 has a portion that overlaps the guide frame 62 in the vertical directions 53 and 54. Thereby, the carriage 35 is prevented from disengaging upward from the guide frame 62.

The guide frame 62 located in front of the guide frame 61 is formed in the shape of a flat plate that is substantially as long as the guide frame 61 in the left-right directions 55 and 56. The guide frame 62 has an edge section 63 configured to support the front end portion 35*a* of the carriage 35. The edge section 63 is bent upward substantially at a right angle. The carriage 35 is slidably supported on an upper surface of the guide frame 62. The carriage 35 pinches the edge section 63 by rollers (not shown). Thus, the carriage 35 is slidably supported on the guide frames 61 and 62. The carriage 35 is movable in a reciprocating manner along the left-right directions 55 and 56, on the basis of the edge section 63 of the guide frame 62.

A belt drive mechanism 46 is disposed on the upper surface of the guide frame 62. The belt drive mechanism 46 includes a first pulley 47, a second pulley 48, and a ring-shaped endless belt 49. The first pulley 47 and the second pulley 48 are disposed near two ends of the conveyance path 21 in the left-right directions 55 and 56, respectively. The ring-shaped endless belt 49 has teeth provided on an inner circumference thereof. Thus, the belt drive mechanism 46 is configured with the ring-shaped endless belt 49 being wound around the first and second pulleys 47 and 48. The first pulley 47 and the second pulley 48 are located at two ends of the range within which the carriage 35 reciprocates in the left-right directions 55 and 56. The first pulley 47 is configured to rotate in response to a driving force being transmitted from a CR motor (not shown) as a driving source to a shaft of the first pulley 47. The rotation of the first pulley 47 causes the belt 49 to make a circulating movement. At this time, the second pulley 48 is driven to rotate by the circulating movement of the belt 49. Examples of the belt 49 may include, but are not limited to, a belt of which two ends are fixedly attached to the carriage 35, as well as the endless belt as shown in FIG. 4.

The carriage 35 is fixedly connected with the belt 49. Although a joint portion between the carriage 35 and the belt 49 is not shown in detail in any drawing, the belt 49 is slightly pulled upward when connected with the carriage 35. Thereby, a tension for elastically returning downward is generated in the belt 49. By the tension, the carriage 35 is elastically urged against the guide frames 61 and 62. As described above, when the belt 49 makes a circulating movement, the carriage 35 reciprocates on the guide frames 61 and 62 on the basis of the edge section 63. Thus, the recording head 37, which is mounted on the carriage 35, is movable in a reciprocating manner with the left-right direction 55, 56 as a main scanning direction.

Each tube 44 is a synthetic resin tube, and has flexibility to bend according to the reciprocating movement of the carriage 35. In the illustrative embodiment, four tubes 44 are provided corresponding to the four ink cartridges 40. One end of each tube 44 is connected with a case (not shown) in which the ink cartridges 40 are set. The other end of each tube 44 is connected with the recording head 37 on the carriage 35. Between the carriage 35 and the ink cartridges 40 in the front-rear directions 51 and 52, each tube 44 extends leftward from the carriage 35, then curves to make a U-turn toward the right, further extends rightward, and is connected with the housing 20 at a fixed location 96. The tubes 44 are disposed as appropriate from the fixed location 96 to the case of the ink cartridges 40. In response to the movement of the carriage 35 along the left-right directions 55 and 56, each tube 44 follows the carriage 35 while changing its U-turn-curved shape.

[Cutting Device]

As shown in FIGS. 2 and 3, ahead of the recording device 17, the cutting device 45 is disposed above the conveyance path 21. The cutting device 45 is, when stopped, located in a stop position that is leftward of an image recording area A1. The image recording area A1 is a maximum width within which image recording is executable by ejecting ink from the recording head 37 reciprocating together with the carriage 35. If a maximum size of the recording sheets 16 on which image recording is executable by the print engine 11 is A4, the image recording area A1 may be wider than the width of the A4 size in the left-right directions 55 and 56.

The cutting device 45 is configured to cut the recording sheet 16 conveyed by the sheet conveyor 43 along the left-right directions 55 and 56. More specifically, the cutting device 45 is configured to cut the recording sheet 16 by moving rightward from the stop position (i.e., the position of the cutting device 45 shown in FIG. 3) that is leftward of the image recording area A1. For instance, a single A4-size recording sheet 16 is cut into two A5-size recording sheets 16 by the cutting device 45. As shown in FIG. 4, the cutting device 45 includes a guide rail 81, a cutter carriage 82, the cutter 83, and a fixed blade 95. The guide rail 81 extends along the left-right directions 55 and 56. The cutter carriage 82 is configured to move while being guided by the guide rail 81. The cutter 83 is mounted on the cutter carriage 82. In FIG. 4, an endless belt 90 (described below) is shown in cross section, to make the configuration of the cutting device 45 easier to understand. In FIG. 2, the cutting device 45 is shown in a simplified form, with a detailed structure thereof omitted.

The guide rail 81 has a flat shape extending along the left-right directions 55 and 56. The guide rail 81 is longer than the conveyance path 21 in the left-right directions 55 and 56. Left and right end portions of the guide rail 81 extend outward from the image recording area A1. Both the end portions of the guide rails 81 in the left-right directions 55 and 56 are fixedly attached to side frames (not shown) that support rotational shafts of the second discharge rollers 28.

The guide rail 81 includes a base plate 81*a*, a first erecting plate 81*b*, a first extending plate 81*c*, a second erecting plate 81*d*, and a second extending plate 81*e*. The base plate 81*a* extends in the left-right directions 55 and 56. The first erecting plate 81*b* extends upward from a rear end of the base plate 81*a*. The first extending plate 81*c* extends rearward from an upper end of the first erecting plate 81*b*. The second erecting plate 81*d* extends upward from a front end of the base plate 81*a*. The second extending plate 81*e* extends frontward from an upper end of the second erecting plate 81*d*. The base plate 81*a*, the first erecting plate 81*b*, the first extending plate 81*c*, the second erecting plate 81*d*, and the second extending plate 81*e* are formed by bending a single rectangular steel plate.

The cutter carriage 82 includes a cutter holder 82*a* and a connecting section 82*b*. The cutter holder 82*a* is configured to hold the cutter 83. The connecting section 82*b* is configured to be connected with the guide rail 81. The cutter holder 82*a* is disposed rearward of the guide rail 81. It is noted that the cutter holder 82*a* may be disposed in front of the guide rail 81. The cutter holder 82*a* extends downward lower than the guide rail 81.

The cutter holding portion 82*a* has an inclined surface 82*c* at an upper portion of an outer surface. The inclined surface 82*c* faces backward and upward. As shown in FIG. 4, when viewed in the left-right directions 55 and 56, the inclined surface 82*c* overlaps the front end portion 35*a* of the carriage 35 in the vertical directions 53 and 54 and in the front-rear directions 51 and 52. Thereby, the image recording apparatus 10 is reduced in size in the vertical directions 53 and 54 and in the front-rear directions 51 and 52. Since the cutter holder 82*a* has the inclined surface 82*c*, a front portion (i.e., a portion close to the connecting section 82*b*) of the cutter holder 82*a* is increased in thickness and strengthened, in the vertical directions 53 and 54 and in the front-rear directions 51 and 52. Moreover, it is possible to reduce a gap between the cutter carriage 82 and the carriage 35.

The connecting section 82*b* extends forward from the cutter holder 82*a*, and is connected with the guide rail 81. The connecting section 82*b* has a first contact portion 84, a second contact portion 85, a third contact portion 86, a fourth contact portion 87, a fifth contact portion 88, and a sixth contact portion 89. The first contact portion 84 is configured to contact an upper surface of the first extending plate 81*c*. The second contact portion 85 is configured to contact a lower surface of the second extending plate 81*e*. The third contact portion 86 is configured to contact a rearward-facing surface of the first erecting plate 81*b*. The fourth contact portion 87 is configured to contact a frontward-facing surface of the first erecting plate 81*b*. The fifth contact portion 88 is configured to contact an upper surface of the second extending plate 81*e*. The sixth contact portion 89 is configured to contact a lower surface of the first extending plate 81*c*.

The guide rail 81 is in contact with the first contact portion 84 and the fifth contact portion 88, thereby supporting the cutter carriage 82 against a downward load. Thus, the cutter carriage 82 is positioned in the vertical directions 53 and 54. The guide rail 81 is in contact with the third contact portion 86 and the fourth contact portion 87, thereby positioning the cutter carriage 82 in the front-rear directions 51 and 52. When the cutter carriage 82 moves upward relative to the guide rail 81, at least one of the second contact portion 85 and/or the sixth contact portion 89 is (i.e., the second contact portion 85, or the sixth contact portion 89, or both the second contact portion 85 and the sixth contact portion 89 are) brought into contact with the guide rail 81. Thereby, it is possible to prevent the cutter carriage 82 from disengaging upward from the guide rail 81.

As shown in FIG. 4, the cutter carriage 82 is driven by a drive mechanism 101. The drive mechanism 101 includes a driving pulley 102, a driven pulley 103, and an endless belt 90 wound around the driving pulley 102 and the driven pulley 103. The driving pulley 102 and the driven pulley 103 are disposed at two end portions in the left-right directions 55 and 56, respectively, on the upper surface of the base plate 81*a*. Each of the driving pulley 102 and the driven pulley 103 is rotatable around an axis along the vertical directions 53 and 54. A driving force from a motor (not shown) is transmitted to the driving pulley 102. The endless belt 90 is connected with the cutter carriage 82, in front of the fourth contact portion 87 of the connecting section 82*b* of the cutter carriage 82. When the driving pulley 102 rotates, the endless belt 90 makes a circulating movement, and the driven pulley 103 is driven to rotate. In response to the circulating movement of the endless belt 90, the cutter carriage 82 reciprocates along the guide rail 81 in the left-right directions 55 and 56. At this time, as shown in FIG. 3, a movable area 92 of the cutter carriage 82 is formed along the guide rail 81. The movable area 92 is a spatial domain in which the cutter carriage 82 is movable.

The cutter 83, supported by the cutter holder 82*a*, protrudes downward from a lower end of the cutter holder 82*a*. The cutter 83 is disk-shaped, and is rotatably supported by the cutter holder 8 with the front-rear direction 51, 52 as an axial direction.

The fixed blade 95 is disposed below the cutter holder 82*a* of the cutter carriage 82. The fixed blade 95 is supported by a side frame (not shown) and extends across the image recording area A1 along the left-right directions 55 and 56. A cutting edge of the fixed blade 95 is in contact with the cutter 83 from behind. The recording sheet 16 is cut by being sandwiched between the cutter 83 and the fixed blade 95.

[Layout]

As shown in FIGS. 2 and 3, the cutting device 45 is disposed in front of the recording device 17 and rearward of the operation panel 19. When viewed in the front-rear directions 51 and 52, the operation panel 19 overlaps the movable area 92 of the cutter carriage 82. In other words, when viewed from the front or the rear, the lower portion 19*c* of the operation panel 19 overlaps the movable area 92 of the cutter carriage 82.

The board housing space 65 is located between the operation panel 19 and the cutting device 45 in the front-rear directions 51 and 52. When viewed in the front-rear directions 51 and 52, the board housing space 65 overlaps the movable area 92 of the cutter carriage 82. More specifically, when viewed in the front-rear directions 51 and 52, a lower portion of the board housing space 65 overlaps the movable area 92 of the cutter carriage 82.

The discharge rollers 28 are disposed under the movable area 92 of the cutter carriage 82. In other words, as shown in FIG. 3, when viewed in the vertical directions 53 and 54, the discharge rollers 28 overlap the movable area 92 of the cutter carriage 82.

The sheet discharge tray 18 is disposed below the cutting device 45. In other words, when viewed in the vertical directions 53 and 54, the sheet discharge tray 18 overlaps the movable area 92 of the cutter carriage 82.

The following provides an explanation of how the image recording apparatus 10 cuts one A4-size recording sheet 16 into two A5-size recording sheets.

When the pick-up roller 32 rotates, a topmost one of A4-size recording sheets 16 is fed from the sheet feed cassette 15 to the conveyance path 21. The recording sheet 16 fed from the sheet feed cassette 15 to the conveyance path 21 is conveyed to below the recording head 37 by the intermediate rollers 24 and the PF rollers 25. The recording sheet 16 conveyed to below the recording head 37 is supported from underneath by the platen 36. While the conveyance of the recording sheet 16 is stopped, the carriage 35 moves along the left-right directions 55 and 56 with ink being ejected from the recording head 37 onto the recording sheet 16. Thereby, a single pass of image is recorded on the recording sheet 16. The image recording on the recording sheet 16 is completed when the image recording apparatus 10 has performed image recording for a particular number of passes while repeatedly performing an operation of conveying and stopping the recording sheet 16. In this example, image recording for two A5-size recording sheets is performed on the single A4-size recording sheet 16. During the image recording, the recording sheet 16 that has passed over the platen 36 is conveyed to below the cutting device 45 by the first discharge rollers 27.

When the center of the recording sheet 16 in the conveyance direction is conveyed to below the cutting device 45, in response to the rotation of the driving pulley 102, the cutter carriage 82 moves rightward from the stop position (i.e., the position of the cutting device 45 shown in FIG. 3) along the guide rail 81. At this time, the first contact portion 84 and the fifth contact portion 88 of the cutter carriage 82 slide on an upper surface of the first extending plate 81*c* and an upper surface of the second extending plate 81*e* of the guide rail 81, respectively. The A4-size recording sheet 16 is pinched by the cutter 83 and the fixed blade 95, and is cut thereby along the left-right directions 55 and 56 into two A5-size recording sheets. The two A5-size recording sheets are discharged from the conveyance path 21 onto the sheet discharge tray 18 by the discharge rollers 28.

Operations and Advantageous Effects of First Illustrative Embodiment

In the image recording apparatus 10 of the first illustrative embodiment, the operation panel 19, when viewed in the front-rear directions 51 and 52, overlaps the movable area 92 of the cutter carriage 82. Therefore, the image recording device 10 is downsized in the vertical directions 53 and 54.

In the image recording apparatus 10 of the first illustrative embodiment, the board housing space 65, when viewed in the front-rear directions 51 and 52, overlaps the movable area 92 of the cutter carriage 82. Therefore, the image recording apparatus 10 is downsized in the vertical directions 53 and 54.

In the image recording apparatus 10 of the first illustrative embodiment, the front surface 19*b* of the operation panel 19 expands along the vertical directions 53 and 54. Therefore, since the front surface 19*b* of the operation panel 19 does not expand in the front-rear directions 51 and 52, the image recording apparatus 10 is downsized in the front-rear directions 51 and 52.

In the image recording apparatus 10 of the first illustrative embodiment, the discharge rollers 28 are disposed under the movable area 92 of the cutter carriage 82. Therefore, the image recording apparatus 10 is downsized in the front-rear directions 51 and 52.

In the image recording apparatus 10 of the first illustrative embodiment, the sheet discharge tray 18 is disposed below the cutting device 45. Therefore, the recording sheets 16 cut by the cutting device 45 are supported on the sheet discharge tray 18.

Modifications of First Illustrative Embodiment

Figure 5A:
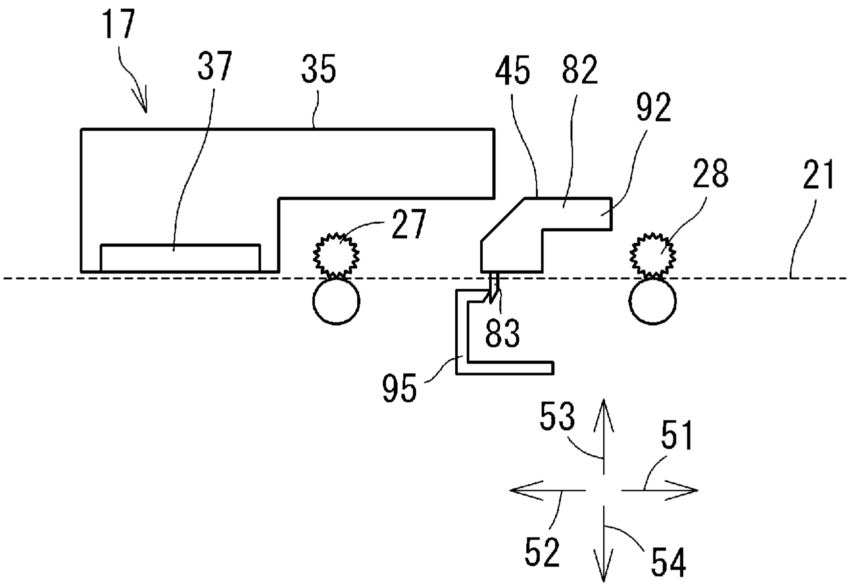
FIGS. 5A and 5B show positional relationships between a cutter carriage and discharge rollers of the image recording apparatus.
Figure 5B:
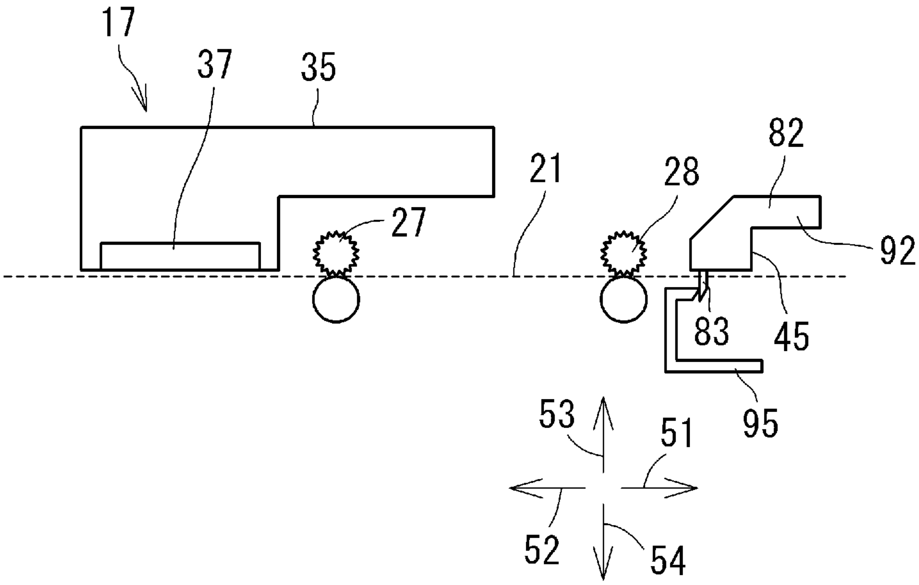

In the aforementioned first illustrative embodiment, the discharge rollers 28 are disposed under the movable area 92 of the cutter carriage 82. However, in another instance, as shown in FIG. 5A, the discharge rollers 28 may be disposed frontward of the movable area 92 of the cutter carriage 82. In yet another instance, as shown in FIG. 5B, the discharge rollers 28 may be disposed rearward of the movable area 92 of the cutter carriage 82.

Second Illustrative Embodiment

An image recording apparatus of a second illustrative embodiment according to aspects of the present disclosure will be described below with reference to FIGS. 6, 7A, and 7B. In the second illustrative embodiment, elements corresponding to those of the first illustrative embodiment will be referred to using the same reference numerals as in the first illustrative embodiment, and explanations of the elements may be omitted.

The image recording apparatus of the second illustrative embodiment is different from the image recording apparatus 10 of the first illustrative embodiment in that the cutting device 45 is located in the opening 13 of the housing 20.

Specifically, when viewed in the left-right directions 55 and 56, the inclined surface 82*c* of the cutting device 45 overlaps a front end portion of the upper wall 71 in the vertical direction 53 and 54 and in the front-rear directions 51 and 52. A rear end of the cutter holder 82*a* is positioned rearward of the rear surface 19*d* of the operation panel 19. A front end of the connecting section 82*b* is positioned frontward of the front surface 19*b* of the operation panel 19. However, the cutting device 45 may be positioned rearward of the front surface 19*b* of the operation panel 19 in the state where the cutting device 45 is located in the opening 13.

As shown in FIG. 7A, the cutting device 45 is, when stopped, located in a stop position that is positioned leftward of the operation panel 19 and the image recording area A1. The discharge rollers 28 is disposed under the upper wall 71, such that the discharge rollers 28 are enabled to convey the recording sheet 16 to the cutting device 45. It is noted that the discharge rollers 28 may be disposed under the movable area 92 of the cutter carriage 82. In this case, two additional rollers for conveying the recording sheet 16 to the cutting device 45 may be disposed under the upper wall 71. The downstream end of the conveyance path 21 extends forward up to the opening 13.

As shown in FIG. 6, the operation panel 19 is configured to rotate around the axis A, between a first position and a second position. As shown in FIGS. 6 and 7A, the first position is such a position that the lower portion 19*c* of the operation panel 19 is located in the movable area 92 of the cutter carriage 82 in a state where the operation panel 19 is erected, i.e., the front surface 19*b* of the operation panel 19 faces forward. The second position is ahead of the first position. The second position is a position (see a solid line in FIG. 6) where the front surface 19*b* of the operation panel 19 faces forward and upward after the operation panel 19 is rotated around the axis A from the first position. In other words, as shown in FIGS. 6 and 7B, the second position is such a position that the operation panel 19 is not located in the movable area 92 of the cutter carriage 82.

In the image recording apparatus 10 of the second illustrative embodiment, one A4-size recording sheet 16 is cut into two A5-size recording sheets in the following manner. In the following description, only different points from the first illustrative embodiment will be explained, and explanations of substantially the same points as the first illustrative embodiment will be omitted.

First, the user pulls the sheet discharge tray 18 forward through the opening 13. Next, the user causes an external information device to send a print command to the image recording apparatus 10. In response to the print command, the operation panel 19 rotates around the axis A from the first position to the second position. A recording sheet 16, which has passed over the platen 36, is conveyed to below the cutting device 45 by the first discharge rollers 27 and the second discharge rollers 28. At this time, the recording sheet 16 is pinched by the second discharge rollers 28 in a state where a front half of the recording sheet 16 protrudes foward from the opening 13. In this state, the cutter carriage 82 moves rightward from the stop position. Thereby, the single A4-size recording sheet 16 is cut into two A5-size recording sheets 16. Then, the two A5-size recording sheets 16 are supported on the sheet discharge tray 18. After completion of the printing, the operation panel 19 rotates around the axis A from the second position to the first position.

Operations and Advantageous Effects of Second Illustrative Embodiment

In an image recording apparatus of the second illustrative embodiment, when the operation panel 19 is in the first position, the lower portion 19*c* of the operation panel 19 is located in the movable area 92 of the cutter carriage 82. Therefore, in this state, when viewed in the left-right directions 55 and 56, the operation panel 19 overlaps the cutter carriage 82. Meanwhile, when the operation panel 19 is in the second position, the operation panel 19 is not located in the movable area 92 of the cutter carriage 82. Therefore, in this state, the cutting device 45 is movable in the left-right directions 55 and 56 without coming into contact with the operation panel 19. Accordingly, when the cutting device 45 is not in operation (e.g., in packing of the image recording apparatus), the operation panel 19 is in the first position, and thereby the image recording apparatus 10 is reduced in size in the front-rear directions 51 and 52 and the vertical directions 53 and 54. When the recording sheet 16 is conveyed, the operation panel 19 is in the second position. Thus, the cutting device 45 is allowed to move in the left-right directions 55 and 56, thereby cutting the recording sheet 16.

In the image recording apparatus of the second illustrative embodiment, when the operation panel 19 rotates from the first position to the second position around the axis A along the left-right directions 55 and 56, the lower portion 19*c* of the operation panel 19 moves frontward of a position of the lower portion 19*c* when the operation panel 19 is in the first position. Therefore, since the operation panel 19 in the second position faces upward, the user is allowed to easily operate the operation panel 19.

In the image recording apparatus of the second illustrative embodiment, the operation panel 19 in the first position is in the erected state where the operation panel 19 extends downward from the axis A to the lower portion 19*c*. Therefore, when the cutting device 45 is not in operation (e.g., in packing of the image recording apparatus), the image recording apparatus of the second illustrative embodiment is more downsized in the front-to-rear directions 51 and 52 than when the operation panel 19 faces upward.

Other Modifications

In the aforementioned first and second illustrative embodiments, the cutting device 45 is configured to cut the recording sheet 16 by the cutter 83 and the fixed blade 95. However, the configuration of the cutting device 45 is not limited to a particular one as long as the cutting device 45 is enabled to cut the recording sheet 16 along the left-right directions 55 and 56. For instance, instead of the fixed blade 95, the cutting device 45 may have two disk-shaped rotatable blades like the cutter 83 that are mounted on the cutter carriage 82.

In the aforementioned first and second illustrative embodiments, the cutting device 45 is configured to cut a standard-form rectangular recording sheet 16. However, the cutting device 45 may be configured to cut a medium pulled out from a roll body with a long medium wound in a roll shape into standard-form rectangular recording sheets 16.

In the aforementioned first and second illustrative embodiments, the conveyance path 21 is a so-called U-turn path that extends upward from the sheet feed cassette 15 and then curves to make a U-turn toward the front. However, a duplex image recording conveyance path may be further provided for image recording on the two sides of each recording sheet 16.

In the image recording apparatus of the aforementioned first and second illustrative embodiments, the first position is such a position that the front surface 19*b* of the operation panel 19 faces forward. However, the first position may be a position where the front surface 19*b* of the operation panel 19 faces forward and upward. In the image recording apparatus of the aforementioned first and second illustrative embodiments, the second position is such a position where the front surface 19*b* of the operation panel 19 faces forward and upward. However, the second position may be a position where the front surface 19*b* of the operation panel 19 faces upward.

In the image recording apparatus of the aforementioned first and second illustrative embodiments, the operation panel 19 is configured to rotate around the axis A from the first position where the front surface 19*b* faces forward to the second position that is located frontward of the first position. However, the configuration of the operation panel 19 is not limited to the above one as long as the operation panel 19 is movable between the first position and the second position. For instance, the operation panel 19 may be configured in such a manner that the lower portion 19*c* of the operation panel 19 is movable from the first position to the second position by a link mechanism. In another instance, the operation panel 19 may be configured to move from the first position to the second position by being translated forward with the front surface 19*b* facing forward.

The following shows examples of associations between elements exemplified in the aforementioned illustrative embodiment and modifications, and elements according to aspects of the present disclosure. For instance, the image recording apparatus 10 may be an example of an "image recording apparatus" according to aspects of the present disclosure. The housing 20 may be an example of a "housing" according to aspects of the present disclosure. The operation panel 19 may be an example of an "operation panel" according to aspects of the present disclosure. The front-rear directions 51 and 52 may be included in examples of a "first direction" according to aspects of the present disclosure. The vertical directions 53 and 54 may be included in examples of a "vertical direction" according to aspects of the present disclosure. The front face of the housing 20 may be an example of "a first-side face of the housing in the particular direction" according to aspects of the present disclosure. The sheet conveyor 43 may be an example of a "sheet conveyor" according to aspects of the present disclosure. In this case, the pick-up roller 32, the two intermediate rollers 24, the two PF rollers 25, the two first discharge rollers 27, and the two second discharge rollers 28 may be included in the "sheet conveyor" according to aspects of the present disclosure. The conveyance path 21 may be an example of a "conveyance path" according to aspects of the present disclosure. The recording device 17 may be an example of a "recording device" according to aspects of the present disclosure. The cutting device 45 may be an example of a "cutting device" according to aspects of the present disclosure. The cutter 83 may be an example of a "cutter" according to aspects of the present disclosure. The cutter carriage 82 may be an example of a "cutter carriage" according to aspects of the present disclosure. The left-right directions 55 and 56 may be included in examples of a "second direction" according to aspects of the present disclosure. The board 22 may be an example of a "board" according to aspects of the present disclosure. The electronic circuit 22*a* may be an example of an "electronic circuit" according to aspects of the present disclosure. The board housing space 65 may be an example of a "board housing space" according to aspects of the present disclosure. The front surface 19*b* of the operation panel 19 may be an example of a "first-side surface" of the "operation panel" according to aspects of the present disclosure. The second discharge rollers 28 may be included in examples of a "discharge roller" according to aspects of the present disclosure. The sheet discharge tray 18 may be an example of a "sheet discharge tray" according to aspects of the present disclosure.

What is claimed is:

1. An image recording apparatus comprising:

a housing;

an operation panel disposed at a first-side face of the housing, the first-side face being a surface on a first side of the housing in a first direction, the first direction being orthogonal to a vertical direction and extending from the first side to a second side of the housing;

a sheet conveyor configured to convey a sheet along a conveyance path and discharge the sheet toward the first side;

a recording device configured to perform image recording on the sheet being conveyed along the conveyance path; and a cutting device disposed closer to the first side of the housing than the recording device is in the first direction, and closer to the second side of the housing than the operation panel is in the first direction, the cutting device comprising:

a cutter configured to cut the sheet; and a cutter carriage configured to move with the cutter mounted thereon along a second direction orthogonal to the first direction and the vertical direction, at least part of the cutter carriage being projected onto at least part of the operation panel in the first direction as the cutter carriage moves in the second direction.

2. The image recording apparatus according to claim 1, further comprising a board having an electronic circuit mounted thereon, wherein the housing has a board housing space containing the board, between the operation panel and the cutting device in the first direction, and wherein the board housing space overlaps a movable area of the cutter carriage when viewed in the first direction.

3. The image recording apparatus according to claim 1, wherein a first-side surface of the operation panel expands along the vertical direction.

4. The image recording apparatus according to claim 1, wherein the operation panel is movable to a first position and to a second position, wherein when the operation panel is in the first position, a portion of the operation panel is located in a movable area of the cutter carriage, and wherein when the operation panel is in the second position, the operation panel is not located in the movable area of the cutter carriage.

5. The image recording apparatus according to claim 4, wherein the operation panel is rotatable around an axis along the second direction, wherein when the operation panel is in the first position, a lower portion of the operation panel is located in the movable area of the cutter carriage, and wherein when the operation panel rotates from the first position to the second position, the lower portion of the operation panel moves toward the first side from a position of the lower portion of the operation panel in the first position.

6. The image recording apparatus according to claim 5, wherein the operation panel in the first position is in an erected state where the operation panel extends downward from the axis to the lower portion.

7. The image recording apparatus according to claim 1, wherein the sheet conveyor comprises a discharge roller disposed under a movable area of the cutter carriage.

8. The image recording apparatus according to claim 1, further comprising a sheet discharge tray disposed below the cutting device, the sheet discharge tray being configured to support the sheet discharged from the conveyance path.

* * * * *